United States Patent
Karhumäki

[19]

[11] Patent Number: 6,048,165

[45] Date of Patent: Apr. 11, 2000

[54] APPARATUS FOR PACKING CONNECTOR PLATES

[75] Inventor: Markku Karhumäki, Riihimäki, Finland

[73] Assignee: MiTek Holdings, Inc., Wilmington, Del.

[21] Appl. No.: 09/011,413

[22] PCT Filed: Aug. 5, 1996

[86] PCT No.: PCT/FI96/00429

§ 371 Date: Jan. 30, 1998

§ 102(e) Date: Jan. 30, 1998

[87] PCT Pub. No.: WO97/06083

PCT Pub. Date: Feb. 20, 1997

[30] Foreign Application Priority Data

Aug. 4, 1995 [FI] Finland .................................. 953735

[51] Int. Cl.[7] .............................................. B65G 57/081
[52] U.S. Cl. .................................. 414/791.3; 414/788.2; 414/788.5; 198/374
[58] Field of Search ........................... 414/788.2, 788.5, 414/788.9, 789.6, 791.3, 794.4; 198/374

[56] References Cited

U.S. PATENT DOCUMENTS

| | | | |
|---|---|---|---|
| 2,091,609 | 8/1937 | Owens et al. | 80/42 |
| 2,117,625 | 5/1938 | Prior | 414/791.3 |
| 2,271,632 | 2/1942 | Diehl | 93/93 |
| 2,609,944 | 9/1952 | Nicoletti | 214/1.1 |
| 2,630,750 | 3/1953 | Eberle | 100/4 |
| 2,842,035 | 7/1958 | Larkin | 93/93 |
| 2,974,789 | 3/1961 | Reifers | 206/65 |
| 2,996,721 | 8/1961 | Black | 1/149 |
| 3,090,504 | 5/1963 | Britton et al. | 214/7 |
| 3,100,301 | 8/1963 | Black | 1/60 |
| 3,146,887 | 9/1964 | Mottin et al. | 209/73 |
| 3,337,905 | 8/1967 | Vedvik | 17/1 |
| 3,377,905 | 4/1968 | McAlpine | 85/13 |
| 3,416,283 | 12/1968 | Sanford | 52/693 |
| 3,473,362 | 10/1969 | Black et al. | 72/326 |

(List continued on next page.)

FOREIGN PATENT DOCUMENTS

| | | | |
|---|---|---|---|
| 1366403 | 11/1964 | France . | |
| 25 32 410 | 2/1977 | Germany . | |
| 36 36 646 | 2/1990 | Germany . | |
| 32 37 255 | 7/1991 | Germany . | |
| 57-85729 | 5/1982 | Japan | 414/791.3 |
| 7613-021 | 5/1978 | Netherlands | 414/791.3 |
| 1212900 | 2/1986 | U.S.S.R. | 414/791.3 |

OTHER PUBLICATIONS

Affidavit of Donald J. Bender, Apr. 27, 1995.
Affidavit of Todd L. Robinson; May 2, 1995.

(List continued on next page.)

Primary Examiner—Douglas Hess
Attorney, Agent, or Firm—Senniger, Powers, Leavitt & Roedel

[57] ABSTRACT

The invention relates to an apparatus for packing connector plates or the like. The apparatus comprises a horizontal conveyor (V) for conveying connector plates (N) to a stacking station (P) at the end of the horizontal conveyor (V) with the plates oriented so that the teeth point substantially upward. A turning conveyor (K) conveys connector plates (N) to the stacking station (P) in an inverted orientation so that nested pairs of connector plates are formed. The horizontal conveyor (V) is in the same longitudinal line with the turning conveyor (K) and partly inside the turning conveyor. The turning conveyor (K) includes two substantially vertical support walls (4) which are provided for rotation around a horizontal axle (6), and a support mechanism (5) attached therebetween. A connector plate (N) to be inverted is supported by the support mechanism travelling in an arcuate path from the horizontal conveyor (V) to the stacking station (P), while being turned upside down, and laid on an unturned connector plate (N) arriving from the horizontal conveyor (V).

20 Claims, 4 Drawing Sheets

U.S. PATENT DOCUMENTS

| | | | |
|---|---|---|---|
| 3,479,979 | 11/1969 | Lidsky | 85/13 |
| 3,498,170 | 3/1970 | Sanford | 85/13 |
| 3,526,773 | 9/1970 | Davis | 250/219 |
| 3,589,495 | 6/1971 | Pearne | 414/791.3 |
| 3,602,963 | 9/1971 | Lingl | 414/791.3 |
| 3,738,514 | 6/1973 | Jones | 214/152 |
| 3,823,835 | 7/1974 | Gott et al. | 414/791.3 |
| 3,880,286 | 4/1975 | Wegener | 206/386 |
| 3,892,168 | 7/1975 | Grobman | 93/93 C |
| 3,895,476 | 7/1975 | Burns, III | 53/26 |
| 3,963,452 | 6/1976 | Jureit et al. | 29/193.5 |
| 3,963,453 | 6/1976 | Singleton, Jr. | 29/197.5 |
| 4,172,513 | 10/1979 | Bradstreet et al. | 196/330 |
| 4,225,095 | 9/1980 | Jureit et al. | 242/1 |
| 4,251,168 | 2/1981 | Groetschel | 405/288 |
| 4,292,785 | 10/1981 | Hammond | 53/399 |
| 4,354,788 | 10/1982 | Giusti | 414/791.3 |
| 4,406,728 | 9/1983 | Ohba et al. | 156/468 |
| 4,427,145 | 1/1984 | Harris | 225/97 |
| 4,460,304 | 7/1984 | Dombach | 414/791.3 |
| 4,494,649 | 1/1985 | Greenwood, Jr. | 198/718 |
| 4,527,933 | 7/1985 | Karhumaki et al. | 411/463 |
| 4,535,587 | 8/1985 | Rias | 53/436 |
| 4,537,010 | 8/1985 | Mojden et al. | 53/447 |
| 4,546,593 | 10/1985 | Lasscock | 53/441 |
| 4,618,054 | 10/1986 | Muller | 198/409 |
| 4,625,535 | 12/1986 | Birckhead | 72/324 |
| 4,664,577 | 5/1987 | Bonali | 414/791.3 |
| 4,936,170 | 6/1990 | Zumeta | 81/180.1 |
| 4,965,740 | 10/1990 | Schofield et al. | 364/512 |
| 5,005,335 | 4/1991 | Yourgalite et al. | 53/399 |
| 5,026,084 | 6/1991 | Pasfield | 283/75 |
| 5,027,700 | 7/1991 | Tschesche | 414/791.3 |
| 5,039,276 | 8/1991 | Leuvering | 414/795.3 |
| 5,218,813 | 6/1993 | Seidel | 53/399 |
| 5,265,722 | 11/1993 | Schmidmeister | 206/321 |
| 5,330,230 | 7/1994 | Craig | 283/81 |
| 5,350,055 | 9/1994 | Lecrone | 198/718 |
| 5,392,908 | 2/1995 | Black, Jr. | 206/321 |
| 5,393,196 | 2/1995 | Bluemle | 414/790.2 |
| 5,395,137 | 3/1995 | Kim | 283/81 |
| 5,445,272 | 8/1995 | Crisp | 206/459.5 |
| 5,634,319 | 6/1997 | Black, Jr. | 53/399 |
| 5,636,494 | 6/1997 | Black, Jr. | 53/399 |

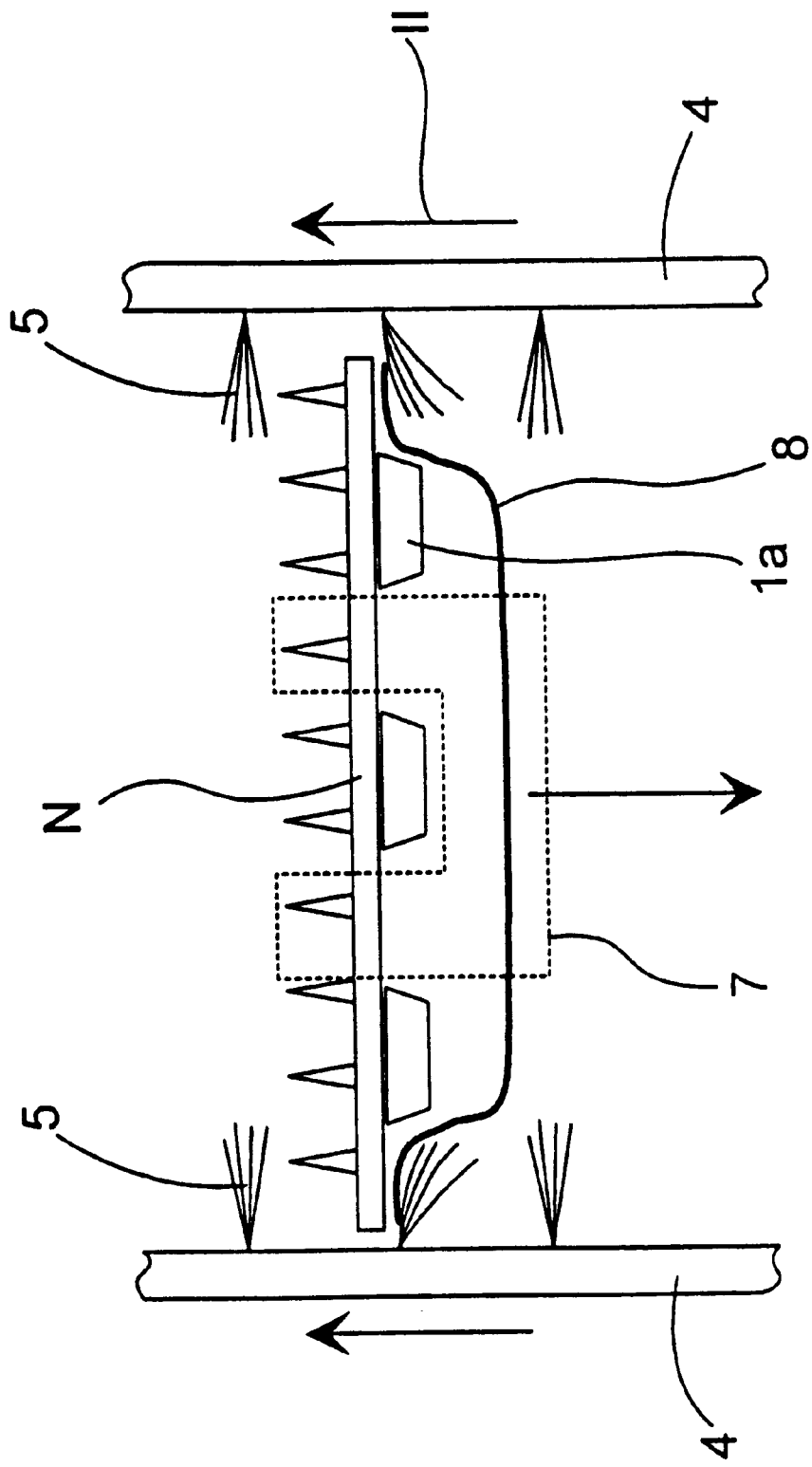

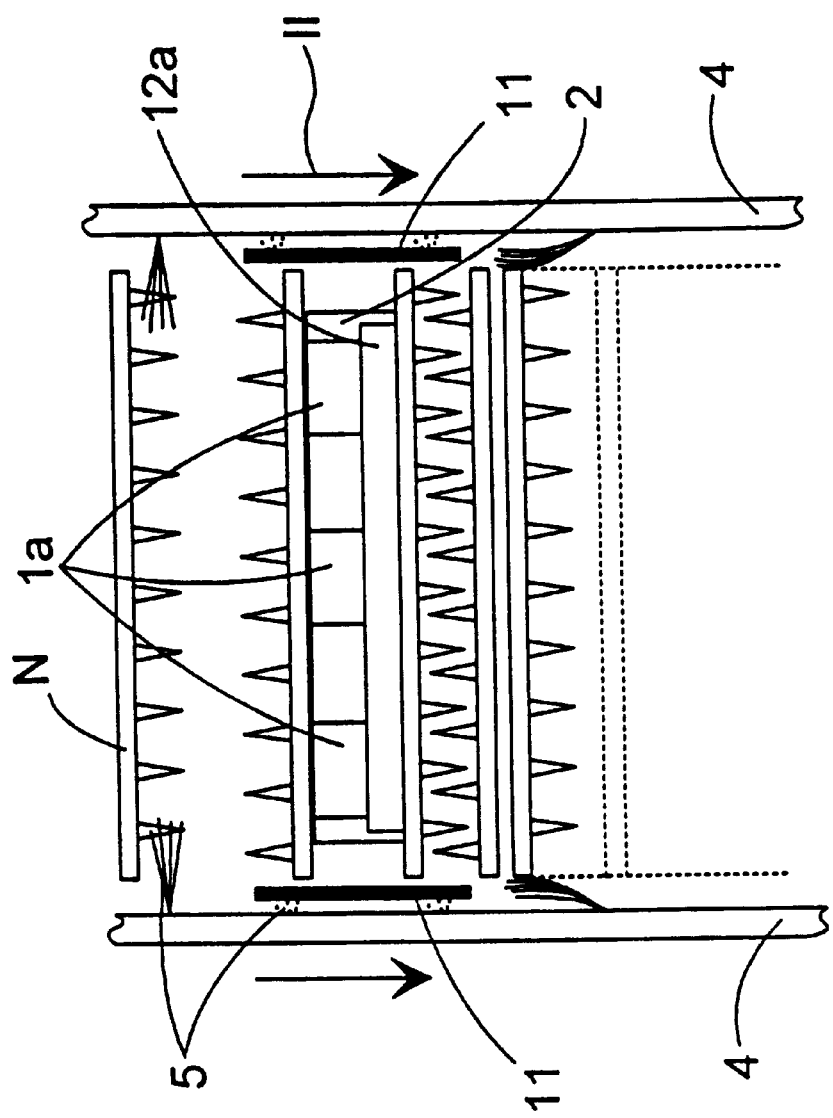

APPARATUS FOR PACKING CONNECTOR PLATES

BACKGROUND OF THE INVENTION

The present invention relates to an apparatus for packing connector plates or the like.

The connector plates are manufactured for example so that rectangular shaped plates are separated from a metal blank, in which teeth are formed by stamping acute-pointed triangular parts to be bent to a substantially perpendicular position with respect to the plates, whereby the finished connector plates comprise several parallel rows of teeth. The teeth can also be formed in a continuous band-like metal blank, wherefrom the individual plates are separated by cutting. Connector plates and manufacturing methods thereof are shown for example in U.S. Pat. Nos. 4,527,933 and 3,479,919.

After the manufacturing process, the connector plates travel to a station where the plates are stacked in a uniform orientation, e.g., so that the teeth point upwards. The finished connector plates are packed, depending on the manner they are finally used, as a stack either so that the teeth in the package extend in the same direction, or most preferably so that the connector plates are formed into nested pairs, where the teeth of the connector plates lie opposite to each other and the teeth are intermeshed with those of the other plate. In the latter case, it is necessary to turn preferably every other connector plate upside down, i.e. so that the teeth project downward, before the packing step to form the above-mentioned pairs of connector plates. The turning can be performed either manually or in an automated manner, depending on the size, manufacturing speed or amount of the connector plates.

In known automatic solutions for turning the connector plates to form the pairs, belt conveyors or the like are usually used between the manufacturing step and packing step. In a known technical solution the conveyors, which usually are two or more in number, always an even number, lie in parallel. On one of the conveyors of a pair the connector plates are introduced for conveying them unturned to the stacking station which is located before the packing step, and the connector plates which are to be turned are introduced on the other one for conveying them to a location where they are turned over. More specifically, the latter of said conveyors conveys the connector plates to the end, where a swinging arm, pivotable in a plane perpendicular to the transfer direction of the conveyors, turns the connector plate along a semi-circular path downward on top of a connector plate that has entered the stacking station through the end of the first conveyor. The turned and unturned connector plates are arranged to enter the stacking station alternately, whereby they are automatically formed into above-described nested pairs of connector plates.

Manual turning and stacking of connector plates is slow and increases the production costs of connector plates and is not therefore suitable for a manufacturing process of large capacity. Known automated solutions require considerable floor area both longitudinally and laterally because of parallel conveyors and further away from the conveyors requires the use of additional devices and/or manual operation. The swinging arm of a known apparatus for turning the connector plates requires a long path of movement and return movement, which decreases the handling capacity. A similar approach is represented by German Patent No. 32-37-255 showing an apparatus for stacking grid plates coming along two parallel lines.

SUMMARY OF THE INVENTION

It is an object of the present invention to provide an apparatus for packing connector plates helping greatly to eliminate the above described drawbacks associated with known solutions and thus to improve the current state of the art.

In the apparatus according to the invention, the transfer of the connector plates to the stacking station without turning takes place along a line parallel to the line of travel or "transfer path" of the connector plates which are to be turned. The turning of the connector plates is performed gradually along the transfer path parallel to the transfer path of the connector plates left unturned, and preferably above the transfer path of the unturned plates. The apparatus does not require separate devices or manual work for separating the connector plates in lateral direction into those which will be turned and those which will not be turned while they are being transferred from the manufacturing process. Moreover, the stacking of the connector plates in the end of the transfer paths takes place automatically. One important advantage of the apparatus according to the invention is that the floor area required by it is considerably smaller both in lateral and longitudinal direction compared with known solutions. An advantage resides also in the fact that the apparatus can be adjusted with small modifications and without any accessory devices to accommodate connector plates of different length, width or other dimensions. Several of the apparatus can be used together in association with a single connector plate manufacturing process.

Other characteristic features of the invention appear from the appended dependent claims.

BRIEF DESCRIPTION OF THE DRAWINGS

The invention will be illustrated more closely in the following description with reference to the accompanying drawings, wherein

FIG. 3 is a representation of section A—A of FIG. 1; and

FIG. 4 is a representation of section B—B of FIG. 1.

DETAILED DESCRIPTION OF THE PREFERRED EMBODIMENT

Figure 1:
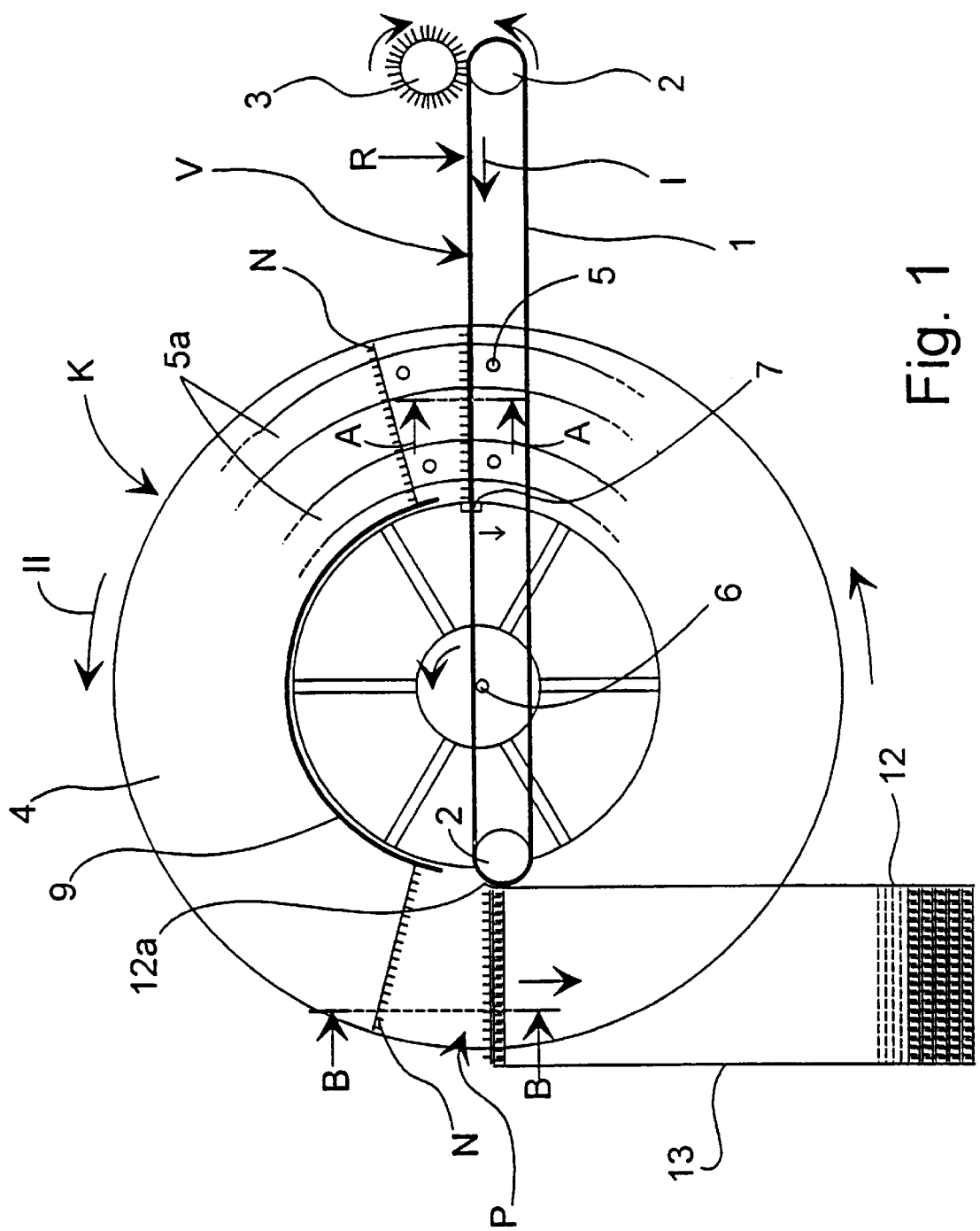
FIG. 1 is a side view of the apparatus.
Figure 2:
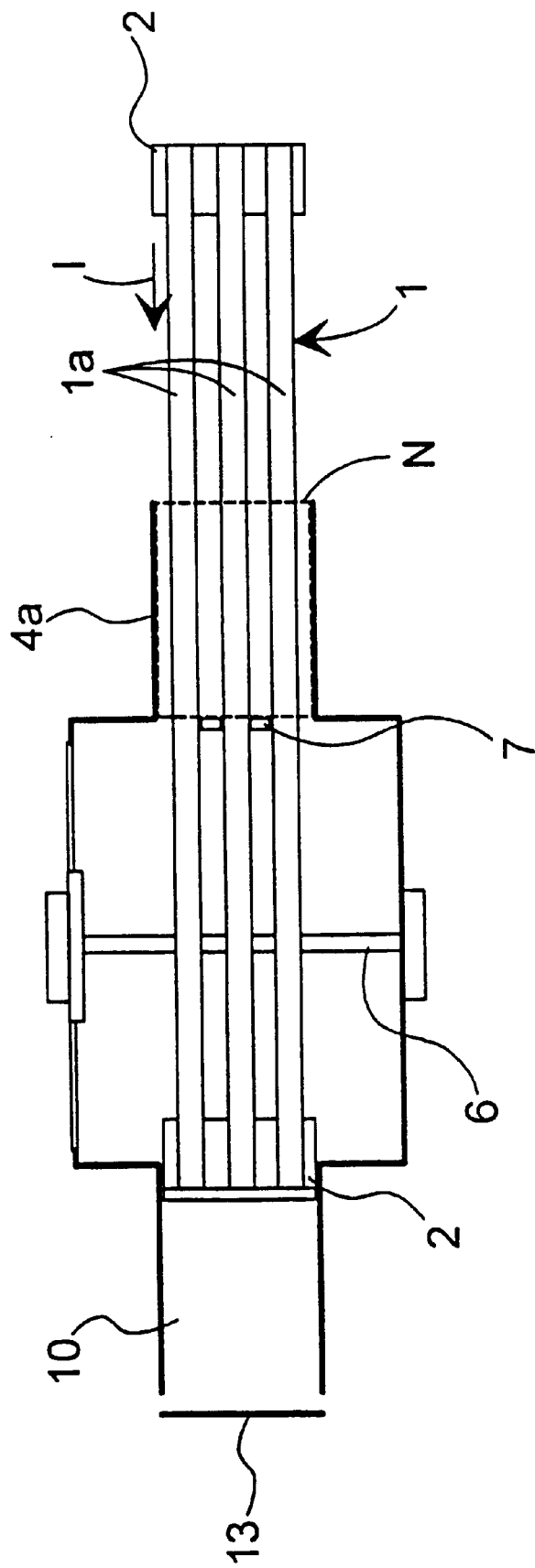
FIG. 2 is a top view of the apparatus.

The apparatus according to the invention comprises a horizontal conveyor V, which is preferably a belt conveyor comprising a conveyor belt 1 extending around at least two rolls 2 according to the embodiment of FIGS. 1 and 2. Connector plates N are fed to the horizontal conveyor V by a feed roll 3 or the like while the conveyor belt 1 moves in direction I. The horizontal conveyor V is placed to form a direct extension of the manufacturing line of the connector plates. The connector plates are fed in a position where their teeth are pointing upwards from the connector plate. The horizontal conveyor V transfers the connector plates N to a stacking station P situated at the other end of the horizontal conveyor as an extension thereof. From this point, the connector plates are further transferred in a stack to be packed into boxes, onto pallets or the like.

The apparatus includes also a turning conveyor K for conveying the connector plates N to the stacking station P in a position where they are turned upside down for the purpose of achieving a stack of connector plates together with the horizontal conveyor V. In the stack, the connector plates are arranged in nested pairs such that the teeth in each pair of connector plates are in an intersticed relationship. The turning conveyor K includes two parallel vertical disk-shaped support walls 4, which are connected to a common horizontal axle 6 and provided for rotation thereabout in the direction of arrow II. As it is apparent from FIGS. 1 and 2, the horizontal conveyor V lies partly between the support walls 4, and it is further positioned so that the upper section of the conveyor belt 1 travels preferably as close to the center of the turning conveyor and to the axle 6 as possible, but slightly above it. In accordance with FIGS. 1 and 2, in the space between the support walls 4, an annular plate housing 10 is defined by the outermost portions 4a of the support walls and by slide barriers 9, which prevent the connector plates from sliding radially from the plate housing 10 towards the center of the turning conveyor K. The slide barrier 9 forms an abutment for the end of a connector plate nearest the axle 6. The slide barrier 9 can be attached in a fixed position on the frame of the apparatus so that is extends above the horizontal conveyor V.

In accordance with FIGS. 1, 3 and 4, substantially horizontal support means 5 are placed on the support walls 4 within the area of the portions 4a. On each support wall 4 two support means 5 are disposed at spaced positions on a radial line extending from the center of the support wall. Multiple radially aligned pairs of support means 5 are located at angularly spaced positions around each support wall 4. Preferably, each pair of support means 5 is co-planar with a pair of support means on the opposite support wall and each support means in the pair is in opposed relation with a corresponding support means on the other wall. The support means may be pivotable pins, shelves or the like, relatively short in construction, connected to the support walls 4 through hinges or through a corresponding method, or according to an advantageous solution shown in FIG. 3, be means consisting of flexible bristles. The purpose of the support means 5 is to receive a connector plate N from the conveyor belt 1 of the horizontal conveyor V to carry it while the turning conveyor K is rotating in direction II, so that the connector plate N will be transferred during the rotation movement to the stacking station P while being turned upside down. As shown in FIG. 1, support strips 5a having pre-assembled support means 5 at regular intervals can be mounted on the support walls 4. For assembling the support strips in the support walls 4, the support walls can be further provided with assembly grooves or the like, in which the support strips can be placed. The assembly grooves are not shown in the accompanying figures.

Hence, the turning conveyor K will gradually turn the connector plates N over while traveling along a transfer path parallel to the transfer path of the horizontal conveyor V, and the turning conveyor can hold several plates at angularly spaced locations. Only a short rotary movement of the turning conveyor is needed for stacking.

A distributor 7 is provided for separating the connector plates N to be turned by the turning conveyor K from those to be guided to the plate housing 10 by the horizontal conveyor V. The distributor 7 is disposed in the path of travel of the connector plates advancing on the conveyor to stop a connector plate to be separated. According to an advantageous embodiment of FIGS. 2–4, the conveyor belt 1 consists of three separate parallel belts 1a or the like, and the distributor 7 is adapted to alternately rise from gaps between the belts in front of a connector plate N to be separated to stop it, and to be lowered to allow a connector plate to continue its travel on the conveyor belt 1 towards the stacking station P. So that the connector plate to be turned reaches the stacking station P at the proper time, it must be immediately picked up by the support means 5 passing the conveyor belt 1. For carrying out this function, the location at which connector plates to be turned over are separated from the horizontal conveyor V is provided with a rising and falling support guide 8 having a raised position and a lowered position. Lateral edges of the support guide 8 are adjacent respective support walls 4. In the raised position, the support guide 8 prevents the support means 5 from entraining the connector plate located at the support guide by deflecting the support means 5 downward. The support guide 8 is so situated in the raised position that it does not prevent the travel of the connector plate on the horizontal conveyor V. As the distributor 7 rises to stop the connector plate to be turned over in the plate housing 10, the support guide 8 is lowered down, so that the connector plate will be lifted on the support means 5 up from the horizontal conveyor V. Thereafter, the distributor 7 and the support guide 8 are returned to their previous positions and the next connector plate will have a clear passage on the horizontal conveyor V to the stacking station P.

Another possibility for entraining a connector plate N on the support means 5 is to position a lifting means (not shown) below the horizontal conveyor at the stop point of the connector plate. The lifting means rises from between the belts 1a and lifts the connector plate N from the horizontal conveyor in the direction of the movement of the turning conveyor K. If there is a risk that the densely spaced support means 5 will come to lie directly in the way of the conveyed connector plates, barriers (not shown) can be arranged on the level of the connector plate edges for bending any flexible support means 5 lying on the same level with the conveyor away from an obstructing position.

After the connector plate has passed its uppermost position during the rotational movement of the turning conveyor K, it will fall to the support of the support means 5 travelling ahead while being lowered toward the stacking station P, where it is laid on top of a connector plate that is in uppermost position in the stack of connector plates and has entered from the horizontal conveyor V. At this moment, the teeth of these connector plates will be nested between each other.

For releasing the connector plate from the support means 5, the stacking station P is provided on both sides of the stack of connector plates with releasers 11. The releasers turn the support means 5 contacting them away to lie parallel with the support walls 4, the connector plate being thus allowed freely to fall on top of the stack of connector plates. The releasers 11 can be plate-like pieces in accordance with the advantageous embodiment of FIG. 4, being arranged stationary at the plate housing 10 or to move back and forth in a substantially horizontal direction into the plate housing 10 and away therefrom. The latter arrangement causes only the support means 5 supporting the connector plate N to be in contact with the releasers 11, which arrangement is able to decrease the wear of the support means and releasers.

According to the advantageous embodiment of FIG. 1, the stacking station P is provided with a substantially vertical stacking shaft U, where the connector plates coming from the turning conveyor K and horizontal conveyor V are gathered for further handling, such as for packing. The stacking shaft U comprises preferably at least a front wall 12 and a back wall 13 as well as, if needed, also side walls (not shown in the figures), which can be partially defined by the support walls 4. At the upper end of the front wall 12 there is a guide extension 12a arched toward the horizontal conveyor V. The purpose of the extension is to guide a conveyor plate coming from the horizontal conveyor V into the stacking shaft U. The downward adjustment of the upper surface of the stack of conveyor plates can be accomplished with spring arrangements, hydraulically or in some other suitable known manner required for further handling of the plates after they are stacked. The connector plates can travel down in the stacking shaft as a continuous stack and be subjected to packing operation in the terminal end of the shaft. The stacking shaft can continue straight down or be curved following a radius of suitable length. The end of the shaft can have a pusher (not shown) which pushes part of the stack emerging from the shaft in the direction of the planes of the connector plates toward the location where packing of the plates takes place.

The movements of the horizontal conveyor V, the turning conveyor K, the feed roll 3, the distributor 7 and the support guide 8 are accomplished by actuators, for example by electric motors and/or pneumatic actuators, and known control automation techniques can be used in the control of movements. It will be understood that depending upon the range of movements of the distributor 7 and the support guide 8, the conveyor belt of the horizontal conveyor V can be adapted to travel for example downwardly over a third roll (not shown) or the like disposed below the horizontal level of the remainder of the horizontal conveyor V.

The horizontal conveyor V is most preferably adapted to convey connector plates while the conveyor belt is operating continuously. Alternatively to the continuous movement, wherein the speeds of the horizontal conveyor v and turning conveyor K are coordinated to transfer the connector plates in a synchronous manner to the stacking station P, the turning conveyor K can be adapted for indexed rotation at predetermined intervals and for predetermined periods. The support means 5 captures one connector plate during one period of rotation and, for example, during the same period a connector plate is released from the support means at the stacking station P. The support means 5 can also be positioned on the support wall 4 according to the movement lengths so that a connector plate to be fed to the turning conveyor K will always be received on some support means during each movement period of the turning conveyor K, in which case the guide support 8 is unnecessary The modification of the apparatus and in particular the plate housing 10 to comply with different connector plate sizes can be accomplished in several ways. It is for example possible to use outermost portions 4a of the support wall 4 having different sizes or shapes to adjust the distance between the support walls 4 on the axle 6 and to use further each time a correspondingly sized and support guide.

Further, before the turning conveyor K there can be a discharge device associated with the horizontal conveyor V. The purpose of this device is to remove from the conveyor V samples or pieces containing the weld connection between successive blank bands from which the connector plates are formed. The discharge device, whose possible location is designated by arrow R in FIG. 1, can for example rise from beneath the conveyor V and remove the piece from the conveyor.

The construction of the apparatus is not restricted only to the solutions shown in FIGS. 1–4, but it can be varied within the inventional concept presented in the appended claims. The function of the turning conveyor, which gradually turns the pieces over, can be accomplished by different mechanisms. It is essential that the transfer part of the turning conveyor hold pieces at several intermediate positions before depositing the pieces turned over in a stack at the stacking station. A piece is deposited in the stack at the stacking station by a short rotary transfer movement of the turning conveyor.

Finally, although the apparatus is especially well suited for handling connector plates, it can be used to handle all plate-like pieces. Generally, the apparatus will handle pieces which are asymmetrical about a plane which can be stacked so that the structure producing the asymmetry nests with the corresponding structure on another identical piece to reduce the height of a stack of pieces. Pieces where one of the flat sides has protrusions or projections (e.g., such as the teeth of a connector plate) and the other one is void of such protrusions or projections are typical examples.

A turning conveyor disc with an outer diameter under one meter is sufficient for stacking normal-sized connector plates, which are used for example in roof trusses, resulting in minimal space requirement both in horizontal and vertical direction. However, the apparatus can be dimensioned to comply with various sizes and types of pieces to be stacked.

I claim:

1. Apparatus for stacking generally thin pieces at a stacking station, the pieces having projections extending from a side of each piece, the apparatus comprising a first conveyor for conveying pieces along a first path toward the stacking station with the projections of the pieces extending generally upwardly, and a second conveyor for conveying pieces along a second path to the stacking station, the second conveyor inverting the pieces before reaching the stacking station so that the projections of the pieces extend downwardly in the stacking station and intermesh with the projections of the pieces conveyed to the stacking station by the first conveyor, the first and second paths being non-coincident, the second conveyor being arranged with respect to the first conveyor so that pieces on the second conveyor moving along the second path move down into the stacking station while the pieces on the first conveyor moving along the first path enter the stacking station from one side of the stacking station.

2. Apparatus as set forth in claim 1 in which the first and second paths are co-planar.

3. Apparatus as set forth in claim 2 wherein the second path is generally semi-circular.

4. Apparatus as set forth in claim 1 wherein the second conveyor is positioned for capturing pieces from the first conveyor to move along the second path.

5. Apparatus as set forth in claim 4 wherein the second conveyor comprises means for supporting a captured piece.

6. Apparatus as set forth in claim 5 wherein said support means comprises resilient members disposed for entraining pieces on the first conveyor thereby to capture the pieces for movement on the second conveyor.

7. Apparatus as set forth in claim 6 wherein said resilient members each comprise flexible bristles.

8. Apparatus as set forth in claim 6 wherein the second conveyor comprises a pair of opposed discs mounted for rotation about a generally horizontal axis, the discs being located on opposite sides of the first conveyor and each disc having said support means thereon, said support means on each disc cooperating to lift pieces off of the first conveyor one at a time and one after another and to move the pieces by rotation along the second path to the stacking station.

9. Apparatus as set forth in claim 8 wherein the second conveyor further comprises a slide barrier engageable by the pieces being moved along the second path for maintaining the pieces at a selected radial position relative on the discs.

10. Apparatus as set forth in claim 5 further comprising a distributor disposed at an intersection of the first and second conveyors, the distributor being selectively movable between a stopping position in which the distributor stops a piece moving with the first conveyor to permit the second conveyor to capture the piece, and a retracted position in which the distributor is out of the path of pieces on the first conveyor thereby permitting the pieces to travel downstream of the distributor on the first conveyor to the stacking station.

11. Apparatus as set forth in claim 10 further comprising a guide for inhibiting engagement of said support means of the second conveyor with the pieces on the first conveyor for preventing said support means from capturing pieces on the conveyor when the distributor is in the retracted position.

12. Apparatus as set forth in claim 11 wherein the guide is movable between a first position in which it inhibits engagement of said support means with the pieces on the first conveyor and a second position in which it does not inhibit engagement of said support means with the pieces on the first conveyor.

13. Apparatus as set forth in claim 1 in combination with the stacking station, and wherein the stacking station comprises a generally vertically extending shaft for receiving a stack of the pieces arranged in nested pairs.

14. Apparatus for stacking generally thin pieces at a stacking station, the pieces having projections extending from a side of each piece, the apparatus comprising a first conveyor for conveying pieces along a first path toward the stacking station with the projections of the pieces extending generally upwardly, and a second conveyor for conveying pieces along a second path to the stacking station, the second conveyor inverting the pieces before reaching the stacking station so that the projections of the pieces extend downwardly in the stacking station and intermesh with the projections of the pieces conveyed to the stacking station by the first conveyor, the second conveyor being positioned for capturing pieces from the first conveyor to move along the second path and wherein the second conveyor comprises resilient members for supporting a captured piece and disposed for entraining pieces on the first conveyor thereby to capture the pieces for movement on the second conveyor.

15. Apparatus as set forth in claim 14 wherein said resilient members each comprise flexible bristles.

16. Apparatus as set forth in claim 14 wherein the second conveyor comprises a pair of opposed discs mounted for rotation about a generally horizontal axis, the discs being located on opposite sides of the first conveyor and each disc having said support means thereon, said support means on each disc cooperating to lift pieces off of the first conveyor one at a time and one after another and to move the pieces by rotation along the second path to the stacking station.

17. Apparatus as set forth in claim 16 wherein the second conveyor further comprises a slide barrier engageable by the pieces being moved along the second path for maintaining the pieces at a selected radial position relative on the discs.

18. Apparatus for stacking generally thin pieces at a stacking station, the pieces having projections extending from a side of each piece, the apparatus comprising a first conveyor for conveying pieces along a first path toward the stacking station with the projections of the pieces extending generally upwardly, and a second conveyor for conveying pieces along a second path to the stacking station, the second conveyor inverting the pieces before reaching the stacking station so that the projections of the pieces extend downwardly in the stacking station and intermesh with the projections of the pieces conveyed to the stacking station by the first conveyor, the second conveyor being positioned for capturing pieces from the first conveyor to move along the second path and wherein the second conveyor comprises means for supporting a captured piece, the apparatus further comprising a distributor disposed at an intersection of the first and second conveyors, the distributor being selectively movable between a stopping position in which the distributor stops a piece moving with the first conveyor to permit the second conveyor to capture the piece, and a retracted position in which the distributor is out of the path of pieces on the first conveyor thereby permitting the pieces to travel downstream of the distributor on the first conveyor to the stacking station.

19. Apparatus as set forth in claim 18 further comprising a guide for inhibiting engagement of said support means of the second conveyor with the pieces on the first conveyor for preventing said support means from capturing pieces on the conveyor when the distributor is in the retracted position.

20. Apparatus as set forth in claim 19 wherein the guide is movable between a first position in which it inhibits engagement of said support means with the pieces on the first conveyor and a second position in which it does not inhibit engagement of said support means with the pieces on the first conveyor.

* * * * *